US010390333B2

(12) United States Patent
Djukic et al.

(10) Patent No.: US 10,390,333 B2
(45) Date of Patent: Aug. 20, 2019

(54) SYSTEM AND METHOD FOR TRANSMISSION SOURCE IDENTIFICATION

(71) Applicant: Huawei Technologies Co., Ltd., Shenzhen (CN)

(72) Inventors: Petar Djukic, Ottawa (CA); Kelvin Kar Kin Au, Kanata (CA); Liqing Zhang, Ottawa (CA); Jianglei Ma, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 563 days.

(21) Appl. No.: 13/886,112

(22) Filed: May 2, 2013

(65) Prior Publication Data

US 2014/0328256 A1 Nov. 6, 2014

(51) Int. Cl.
*H04W 72/04* (2009.01)
*H04L 1/00* (2006.01)

(52) U.S. Cl.
CPC ....... *H04W 72/0413* (2013.01); *H04L 1/0045* (2013.01); *H04L 1/0061* (2013.01)

(58) Field of Classification Search
None
See application file for complete search history.

(56) References Cited

U.S. PATENT DOCUMENTS

| 6,246,670 | B1 * | 6/2001 | Karlsson | H04L 29/12216 370/244 |
| 6,529,727 | B1 | 3/2003 | Findikli et al. | |
| 8,483,215 | B2 * | 7/2013 | Jonsson et al. | 370/389 |
| 8,625,516 | B2 * | 1/2014 | Lindoff et al. | 370/329 |
| 2002/0170013 | A1 * | 11/2002 | Bolourchi et al. | 714/758 |
| 2003/0103480 | A1 * | 6/2003 | You et al. | 370/335 |
| 2005/0063347 | A1 * | 3/2005 | Sarkkinen | H04L 69/22 370/338 |
| 2006/0114877 | A1 * | 6/2006 | Heo et al. | 370/342 |
| 2007/0171910 | A1 | 7/2007 | Kumar | |
| 2007/0218901 | A1 * | 9/2007 | Tenny | 455/436 |
| 2009/0086670 | A1 * | 4/2009 | Hart et al. | 370/329 |
| 2009/0147738 | A1 * | 6/2009 | Larsson et al. | 370/329 |
| 2009/0232115 | A1 | 9/2009 | Horn | |

(Continued)

FOREIGN PATENT DOCUMENTS

CN 101394222 A 3/2009
CN 101754410 A 6/2010

(Continued)

OTHER PUBLICATIONS

Dahlman, E. et al., "4G LTE/LTE-Advanced for Mobile Broadband, Section 10.4.9 Blind Decoding of PDCCHs," Elsevier, Mar. 21, 2011, 197-202.

(Continued)

*Primary Examiner* — Nicholas Sloms
(74) *Attorney, Agent, or Firm* — Slater Matsil, LLP

(57) ABSTRACT

A method embodiment includes receiving, by a first network device, a first transmission comprising an explicit first source identification (ID). The first source ID is added to a list of active source IDs. The first network device receives a second transmission. The second transmission does not include an explicit second source ID. The first network device determines the second source ID by using the list of active source IDs.

21 Claims, 4 Drawing Sheets

(56) References Cited

U.S. PATENT DOCUMENTS

| | | | |
|---|---|---|---|
| 2010/0165943 A1* | 7/2010 | Kato et al. | 370/329 |
| 2010/0318886 A1* | 12/2010 | Bolourchi et al. | 714/808 |
| 2011/0116428 A1* | 5/2011 | Seong et al. | 370/311 |
| 2011/0141998 A1* | 6/2011 | Nishio et al. | 370/329 |
| 2011/0243081 A1* | 10/2011 | Liu et al. | 370/329 |
| 2012/0163204 A1* | 6/2012 | Oprescu-Surcobe et al. | 370/252 |
| 2012/0176908 A1* | 7/2012 | Lee | H04L 1/188 370/241 |
| 2012/0190363 A1* | 7/2012 | Maeda et al. | 455/435.1 |
| 2013/0003569 A1* | 1/2013 | Lindoff | H04L 1/0045 370/252 |
| 2013/0022012 A1* | 1/2013 | Lee | H04W 52/0216 370/329 |
| 2013/0040642 A1* | 2/2013 | Xu et al. | 455/435.1 |
| 2013/0114429 A1* | 5/2013 | Jonsson et al. | 370/252 |
| 2014/0010212 A1* | 1/2014 | McNamara | H04W 72/1289 370/336 |
| 2015/0043455 A1* | 2/2015 | Miklos | H04W 8/26 370/329 |

FOREIGN PATENT DOCUMENTS

| | | |
|---|---|---|
| CN | 101998550 A | 3/2011 |
| CN | 102223621 A | 10/2011 |
| CN | 102340826 A | 2/2012 |
| WO | 2010108136 A1 | 9/2010 |
| WO | 03085874 A1 | 10/2013 |

OTHER PUBLICATIONS

Huawei Technologies Co., Ltd., "International Search Report & Written Opinion", International Application No. PCT/CN2014/076554, dated Jul. 29, 2014, 11 pages.

3rd Generation Partnership Project; Technical Specification Group Radio Access Network; Evolved Universal Terrestrial Radio Access (E-UTRA); Multiplexing and channel coding (Release 14), 3GPP TS 36.212, V14.0.0, Sep. 2016, 148 pages.

3rd Generation Partnership Project; Technical Specification Group Radio Access Network; Evolved Universal Terrestrial Radio Access (E-UTRA); Physical layer procedures (Release 14), 3GPP TS 36.213, V14.0.0, Sep. 2016, 406 pages.

* cited by examiner

SYSTEM AND METHOD FOR TRANSMISSION SOURCE IDENTIFICATION

TECHNICAL FIELD

The present invention relates to a system and method for communications, and, in particular embodiments, to a system and method for transmission source identification.

BACKGROUND

In a typical wireless network such as long-term evolution (LTE) network, a particular network device may receive transmissions from multiple other network devices. For example, a base station (BS) may receive uplink transmissions from multiple user equipment (UEs). Since each transmission may originate from multiple transmitters, a certain amount of signaling is required to distinguish each transmitter at the receiver. For example, in current cellular networks, the BS instructs each UE when to transmit and which resources to use during transmission, which implicitly identifies the UE during its transmission. As another example, in current 802.11 networks, stations (STA) append their unique medium access control (MAC) address to each transmission in order to identify themselves as the source of the transmission.

Future networks are expected to be a hybrid between current cellular networks and current 802.11 networks, where the signaling is reduced greatly with blind detection of transmissions. For example, instead of a BS directly instructing UE on how to execute each transmission, UEs may be allowed to transmit autonomously in specific resource regions of frequency, time and/or code. Blind detection of transmissions may require the UEs to use some type of identifier so that the BS can identify the source of each transmission.

An issue with including a MAC ID (or similar identifier) in each transmission is that the signaling resource overhead can be quite large compared to the data transmitted, especially in cases where the amount of data transmitted is small. For example, a source identification (ID) may be 16 bits, 32 bits, 48 bits, 128 bits or even longer in length, whereas the data coming from a transmitter may be 20-30 bits (e.g. temperature reading). Even in blind or grant-free transmission networks (i.e., networks that do not use control messages to schedule/grant transmissions), a certain amount of overhead is still used to explicitly signal and identify the source of transmissions.

SUMMARY OF THE INVENTION

These and other problems are generally solved or circumvented, and technical advantages are generally achieved, by preferred embodiments of the present invention which provide a system and method for transmission source identification.

In accordance with an embodiment, a method includes receiving, by a first network device, a first transmission comprising an explicit first source identification (ID). The first source ID is added to a list of active source IDs. The first network device receives a second transmission. The second transmission does not include an explicit second source ID. The first network device determines the second source ID using the list of active source IDs.

In accordance with another embodiment, a network device includes a processor and a computer readable storage medium storing programming for execution by the processor. The programming including instructions to receive a first transmission comprising an explicit first source identification (ID), add the first source ID to a list of active source IDs, receive a second transmission, and determine the second source ID using the list of active source IDs. The second transmission does not include an explicit second source ID.

In accordance with another embodiment, a method for transmission source indication including transmitting, by a first network device, a first transmission comprising an explicit source identification (ID) of the first network device to a second network device. The first network device also transmits a second transmission, wherein the second transmission does not comprise the explicit source ID to the second network device. The source ID is embedded in the second transmission.

In accordance with yet another embodiment, a network device includes a processor and a computer readable storage medium storing programming for execution by the processor. The programming including instructions to transmit, to a second network device, a first transmission comprising an explicit source identification (ID), and transmit, to the second network device, a second transmission, wherein the second transmission does not comprise the explicit source ID. The source ID is embedded in the second transmission.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Various embodiments are described with respect to a specific context, namely a LTE wireless communication network. Various embodiments may also be applied, however, to any other current or future wireless or wired network where a network device receives transmissions from multiple sources. Some examples of such networks include worldwide interoperability for microwave access (WiMAX) network, a WiFi network, a network operating under an IEEE 802.15 standard, sensor networks (e.g., underwater acoustic networks), an Ethernet network, and the like.

Figure 1:
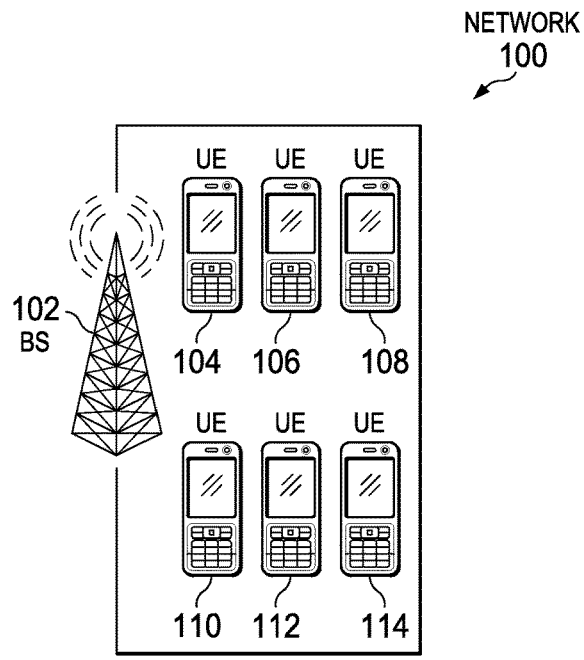
FIG. 1 is a block diagram illustrating a network in accordance with various embodiments.

FIG. 1 illustrates a block diagram of a network 100 according to various embodiments. A network device (e.g., base station (BS) 102) receives transmissions from various other network devices (e.g., UEs 104-114). BS 102 may alternatively be referred to as a cell tower, an eNodeB, an access network, and the like. BS 102 may support transmissions for multiple cellular carrier providers concurrently.

When a UE (e.g., UE 104) starts transmitting data to BS 102, it explicitly signals its source identification (ID) (also referred to as a UE ID) with the first transmission. For example, a UE may place its source ID in a transmission packet/frame. Alternatively, the UE may send an empty packet with only its source ID. In this alternative, there may be one or more special resources configured by the network for the purpose of transmitting source IDs. These special resources may be similar in function to physical random access channel (PRACH) resources in current LTE networks.

The source ID may be assigned by the manufacturer as a unique identifier, similar to 48-bit Ethernet address, or the SIM card ID. Alternatively, when a UE first accesses a particular network, a new source ID unique for that particular network is assigned to the UE. Alternatively, UE may select its own source ID. For example, a BS may broadcast information indicating to the UE which source IDs are available (i.e., unused). The UE may then choose one of these available source IDs. In another example, the UE may choose its source ID randomly from a pool of source IDs. The network may employ a mechanism to resolve collisions between the chosen source IDs (i.e., to prevent two UEs from choosing the same source ID). For example, a BS may reject a particular source ID by indicating a negative acknowledgment to the UE when the BS detects a source ID collision.

The transmission mechanism for the first transmission may further include a mechanism to ensure the proper deliver of the source ID. For example, if the source ID is transmitted alone, the transmission may further include a cyclic redundancy check (CRC) to verify its contents. Furthermore, acknowledgement signals may be sent by a receiver to the transmitter in accordance with the received source ID. Therefore, if the source ID was not properly transmitted, the transmitter may never receive a proper acknowledgement frame. Therefore, the transmitter may retransmit its source ID if an acknowledgement is not received within a certain time frame (e.g., if the transmitter's acknowledgement timer expires).

Subsequently, the UE may not explicitly signal its source ID with each transmission. Instead, the UE embeds its source ID into the message itself, for example, by scrambling a portion of each subsequent transmission with its source ID. When BS 102 receives the first transmission with the explicit source ID, BS 102 adds the source ID to a list of active source IDs. In subsequent transmissions, BS 102 may identify the source of a transmission by descrambling the scrambled portion of the subsequent transmissions. BS 102 may achieve this by trying each source ID in the active source ID list until the transmission is successfully decoded and descrambled. A mechanism may also be included to remove inactive source IDs from the active source ID list to keep the active source ID list fresh and to control the complexity level of descrambling transmissions. Although only one BS 102 and six UEs 104-114 are illustrated in FIG. 1, a typical BS may receive transmissions from a varying multitude of UEs. Furthermore, various embodiments may also be applied to an access point receiving transmissions from multiple stations in a WiFi network, a base station receiving transmissions from multiple other base stations, a UE receiving transmissions from multiple UEs, a UE receiving transmissions from multiple base-stations, or the like.

Alternatively, other mechanisms may also be possible to avoid signaling UE ID in subsequent transmissions. For example, the UE may have dedicated resources in subsequent transmission such as unique time resources, frequency resources, layer resources, code resources, combinations of such resources, or a hopping pattern of such resources. The resource or resources uniquely identifies the UE. Therefore, the UE may explicitly signal its ID in the first transmission, and in subsequent transmission its ID is implicitly defined by the resource it uses. For example, if the UE makes a first transmission on given time, frequency, layer, or code resources, the BS will expect subsequent transmissions on the same resource to be from the same UE. The BS may also expect that the subsequent transmissions may be on some derived resource based on UE ID, by for example a fixed hopping pattern. The BS maps resources to active IDs and uses the list of active IDs to determine a transmission's source IDs from the resources used for the transmission.

Figure 2A:
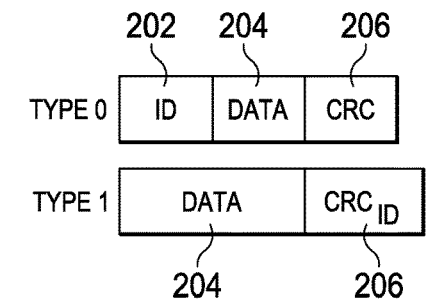
FIGS. 2A and 2B are block diagrams illustrating example transmission packet types in accordance with various embodiments.
Figure 2B:
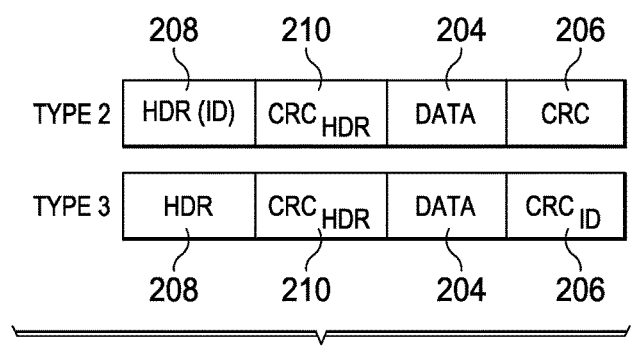

FIGS. 2A and 2B illustrate various transmission packet formats in accordance with various embodiments. In FIG. 2A, two transmission packet formats are illustrated. Format type 0 includes an ID field 202, a data field 204, and a cyclic redundancy check (CRC) field 206. ID field 202 may include an explicit source ID of a transmitter (e.g., UE 104's UE ID). Therefore, format type 0 may be sent by a transmitter to a receiver (e.g., a BS 102) as a first transmission in a session. Upon receiving the first transmission, the receiver adds the source ID in field 202 to a list of active source IDs. CRC field 206 is a parity field for checking the integrity of data in field 204 at the receiver. For example, a CRC value may be calculated for data in fields 202 and 204 before the transmission. The CRC is then inserted into field 206 as part of the transmission. After the transmission is received, the receiver calculates a CRC from the received data in fields 202 and 204 and compares the two CRCs (i.e., the one calculated by the receiver and the one transmitted in field 206). If the two CRCs are different, then the receiver knows a transmission error occurred.

Format type 1 may be used to transmit data after a first transmission in a session. Format type 1 includes data field 204 and CRC field 206. However, format type 1 does not include ID field 202 and does not explicitly signal the transmitter's source ID to the receiver. Rather, the source ID is embedded in the transmission by placing a CRC scrambled with the source ID is in CRC field 206. The scrambling process may include the transmitter calculating the CRC of the transmission data. The transmitter then scrambles the CRC with its source ID, for example, by applying an exclusive or (XOR) function on the CRC and the source ID. The source and destination can also use any one-way function that maps a unique integer to another unique integer, such as discrete exponential function.

The receiver determines the source of the transmission by descrambling the CRC in field 206 using the list of active source IDs. For example, the receiver may calculate a CRC value from the received and decoded data and then compare the result with the received CRC in field 206. If the two CRCs do not match, the receiver determines the CRC in the transmission may be scrambled. The receiver may then try to descramble the CRC using a first source ID in the list of source IDs. This may be done, for example, by calculating the CRC from the decoded data and then scrambling it with the first source ID. Comparing the decoded and scrambled CRC with the received CRC, the receiver may determine if the descrambling was successful (i.e., if the two CRCs are the same). If there is a match, the receiver identifies the source ID used to successfully decode the scrambled CRC as corresponding to the source of the transmission. If there is no match, the receiver attempts to descramble the CRC with the next source ID in the list of active source IDs. If the list is exhausted, then the receiver determines that the transmission failed.

FIG. 2B illustrates alternative transmission packet formats in accordance with various embodiments. Format type 2 is similar to format type 0 and includes a data field 204 and a CRC field 206. However, format type 2 does not include an ID field 202. Instead, a source ID may be explicitly signaled in a header field 208. Format type 2 also includes a CRC field 210 for including a header CRC with a transmission, so that the receiver may determine if the header was properly transmitted. Similarly to format type 0, format type 2 may be used by the transmitter for a first transmission in a session.

Format type 3 includes the same fields as format type 2. However, a source ID is not included in header field 208. Instead, an embedded source ID is included by scrambling with either the header CRC or the data CRC with the source ID, and this embedded source ID is placed in the corresponding field (i.e., CRC field 210 or 206). As a practical matter, a header CRC may not be long enough to successfully scramble a source ID. For example, a typical header CRC may only be a few bits in length whereas a source ID may be 16 bits or more long. In such cases, the data CRC may be exclusively scrambled with the source ID. While the packet formats in FIGS. 2A and 2B illustrate a CRC being used to scramble a source ID, the source ID may be used to scramble any portion of the transmission packet. For example, assume that the CRC is N bits long and the source ID is M+N bits long. Then, it is possible to only use the last N bits of the user ID to scramble to the CRC. The receiver only uses the last N bits of the user ID to descramble the packets. Alternatively, the M bits may be used to scramble last M bits of the data before the CRC is calculated, and the N bits may be used to scramble the CRC after it is calculated. At the receiver, the data is decoded, the last M bits of the data are descrambled, CRC is calculated, and then the CRC is descrambled with the last N bits of the user ID. Alternative embodiments may also use different transmission packet formats than those illustrated in FIGS. 2A and 2B.

Because the complexity of receiver operation may become impractically high if the list of active source IDs becomes large, various embodiments include mechanisms for controlling this complexity by removing inactive source IDs from the active source ID list. An inactive source ID is a source ID of a transmitter that is unlikely to transmit more data in a traffic session. The receiver may determine a source ID is inactive in a number of ways. For example, an expiration timer for each source ID may be set as the source ID is added to the active source ID list. The receiver may reset this expiration timer each time it receives a new transmission from that source. When an expiration timer expires, the source ID corresponding to the timer is removed from the active source ID list. On the transmitter's end, the transmitter also sets a similar expiration timer when it sends a first transmission in session (e.g., a transmission using format type 0 or format type 2). The transmitter may reset this timer as it sends out subsequent transmissions (e.g., transmissions using format type 1 or format type 3). However, if the timer ever expires, the transmitter recognizes the session has ended and may send its source ID explicitly in the next transmission (e.g., format type 0 or format type 2). This allows the receiver to re-introduce the source ID into the list of active source IDs. The receiver may also reset the expiration timer as a new session starts.

The expiration timer is a configurable parameter that is coordinated on both ends of transmission/reception. Therefore, the receiver may indicate to the transmitter the length of its expiration timer after the first reception (e.g., as part of an acknowledgement signal). Alternatively, the transmitter may indicate to the receiver the length of the expiration timer in a first transmission of a traffic session (i.e., a transmission using format type 0 or type 2). The expiration timer may be set to be slightly longer than the expected length of a traffic session. Therefore, the length of the expiration timer may vary depending on the type of various transmissions. For example, if the transmitter/receiver determines the transmissions relate to an internet browsing session or a telephone call, the expiration timer may have a length in the order of minutes. However, if the transmitter/receiver determines the transmissions are text messages, the expiration timer may have a length in the order of seconds. The length of various expiration timers may be defined by a standard, for example, in a table and the transmitter/receiver may determine the type of a transmission (e.g., either through explicit signaling or deduction from transmission contents) and an appropriate expiration timer length from the table.

In alternative embodiments, the receiver removes inactive source IDs from the list of active source IDs without a timer. For example, in certain types of transmissions, the receiver may determine when a transmission is the last one in a session from transmission contents. For example, certain TCP packets include fields identifying a packet as being the last one in a session. In another example, a receiver may explicitly signal to a transmitter when a packet is the last one in a traffic session. By eliminating inactive source IDs from the list of active source IDs, the receiver may control the level of complexity in decoding source IDs from transmissions.

Figure 3:
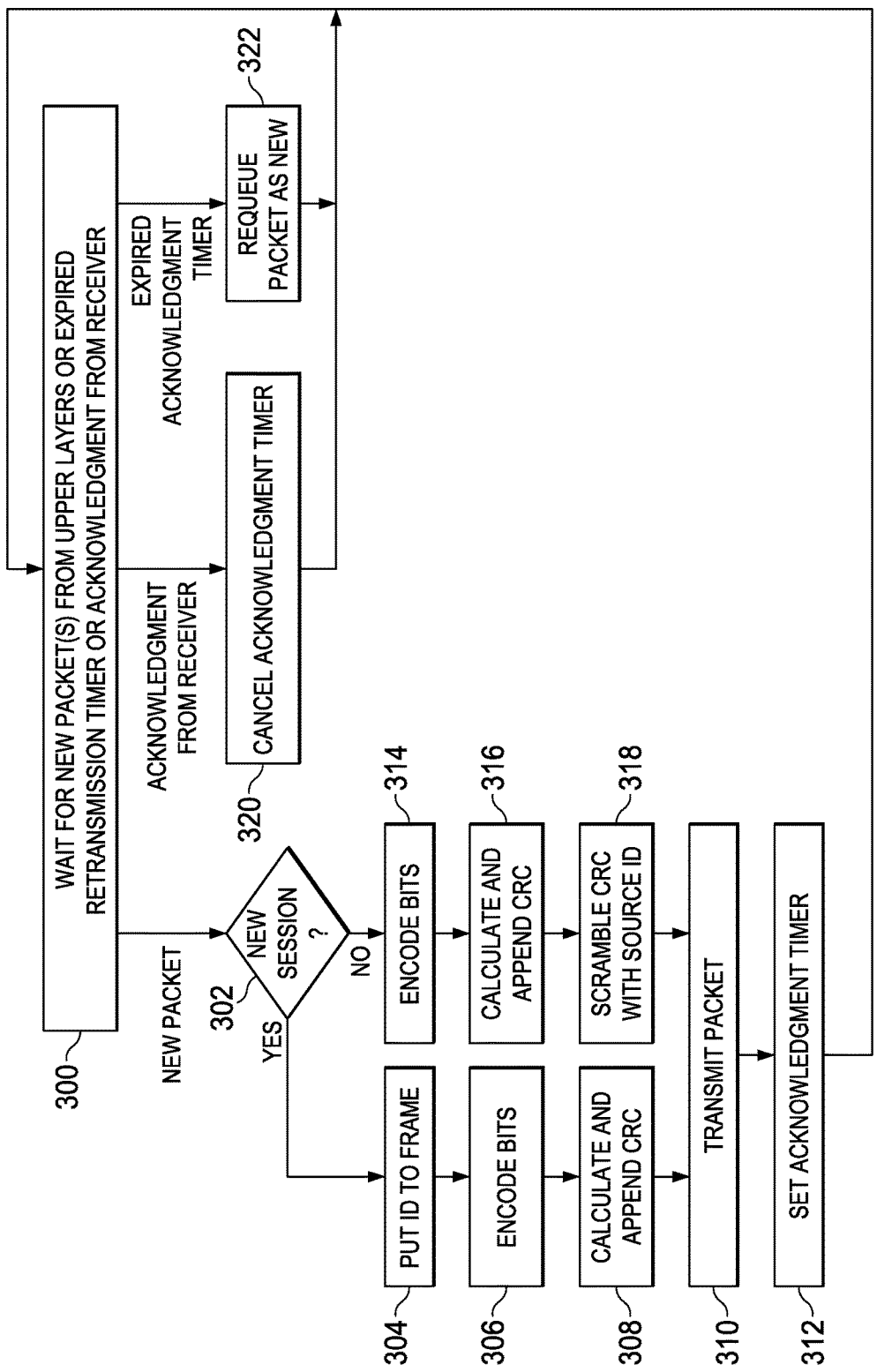
FIG. 3 is a flow diagram of transmitter activity in accordance with various embodiments.

FIG. 3 illustrates a flow diagram of transmitter (e.g., a UE) activity in accordance with various embodiments. In step 300, the transmitter is in idle mode as it waits for a new packet to transmit from upper layers and/or for an acknowledgement from a receiver. When the transmitter wants to transmit a new packet, it proceeds to step 302 and determines if a new session has started. A new session may be started, for example, if the transmission is the first one the transmitter is sending to a particular receiver, an expiration timer has expired, a previous transmission indicated to the receiver a previous session has ended, or the like.

If a new session should be started, then in step 304, the transmitter places its source ID in an appropriate field (e.g., ID field 202 in formats type 0 and type 1). Then in step 306, the transmitter encodes data bits using known modulation and coding techniques, and in step 308, the transmitter calculates and appends a CRC to the transmission packet. If this is not a new session (i.e., the transmitter' source ID is on a list of active source IDs at the receiver), in step 314, the transmitter encodes the data bits using known modulation and coding techniques. In step 316, the transmitter calculates a CRC from the data and appends it to the transmission packet. In step 318, the transmitter scrambles the CRC with its source ID. Notably, the transmitter does not place its source ID explicitly in the transmission. In step 310, the transmitter transmits the packet, and in step 312, the transmitter may set an acknowledgement timer. The transmitter then returns to step 300 to wait for new packets from upper layers or an acknowledgement from the receiver.

If the transmitter receives an acknowledgement from the receiver, the transmitter determines the packet was delivered successfully and in step 320, may cancel the acknowledgement timer. If the acknowledgement timer expires before the transmitter receives an acknowledgement, then in step 322, the transmitter requeues the packet as a new pack for re-transmission. Because the transmitter only needs to be signaled if transmission was successful, signaling overhead may be conserved. Alternatively, the transmitter may not set an acknowledgement timer and assume the transmission was successful unless it receives an indication otherwise from the receiver.

Figure 4:
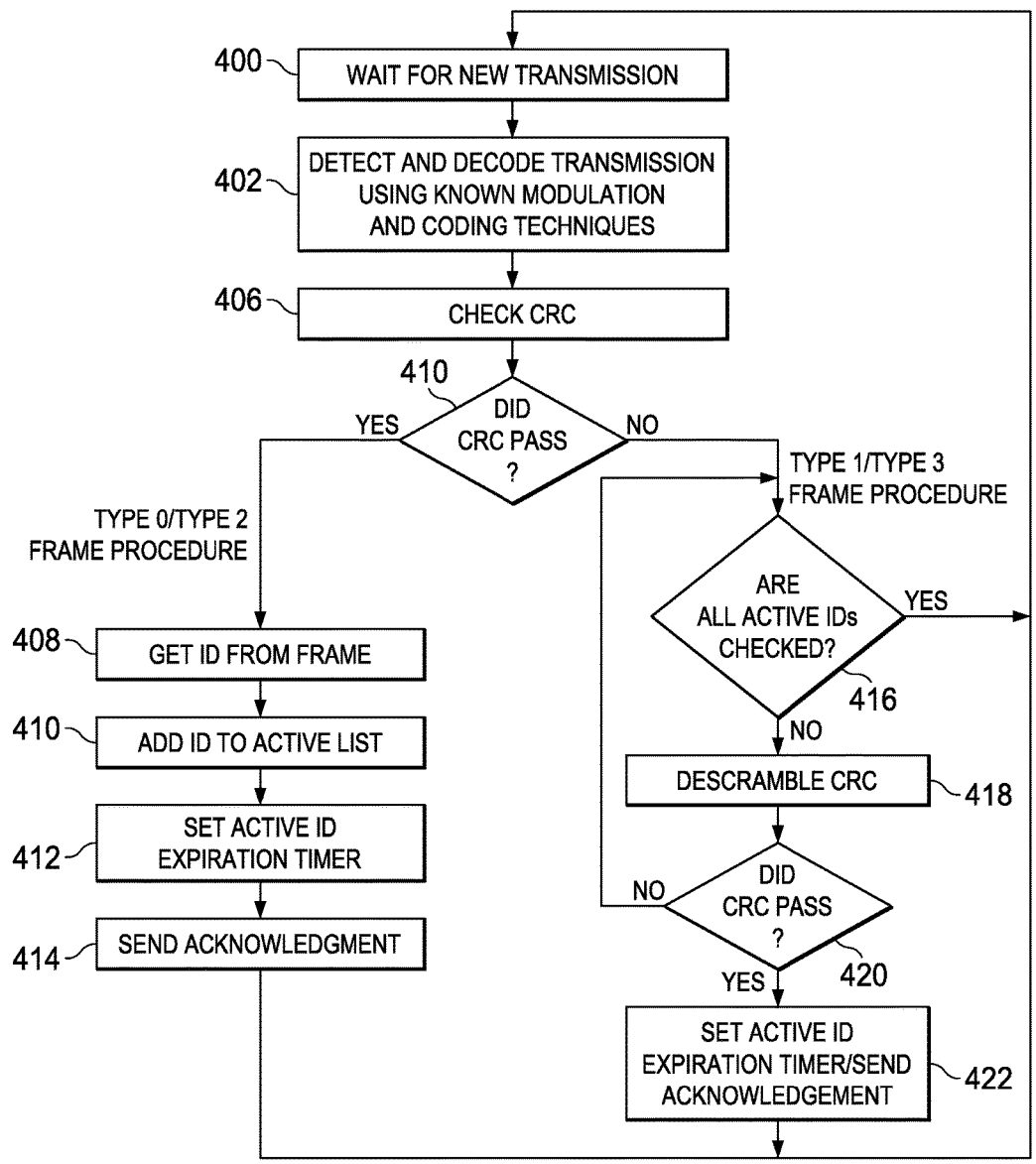
FIG. 4 is a flow diagram of receiver activity in accordance with various embodiments.

FIG. 4 illustrates a flow diagram of receiver (e.g., a BS) activity in accordance with various embodiments. In step 400, the receiver waits for a new transmission to arrive. The receiver may broadcast/multicast its ability to receive scrambled source IDs so that transmitters may format transmissions accordingly. In step 402, the receiver receives a packet and decodes the packet using known modulation and coding techniques. In step 404, the receiver checks the CRC by calculating a received CRC from the received data and comparing the received CRC with the transmitted CRC in the packet. In step 406, the receiver determines if the two CRCs are the same.

If the two CRCs are the same, the receiver determines that the transmitted CRC is not scrambled and the packet is formatted using, for example, a type 0 or type 2 formats. Therefore, the receiver knows the source ID is explicitly signaled and may be retrieved from the packet directly (step 408). In step 410, the receiver places the frame in the list of active source IDs. In step 412, the receiver may set an expiration timer for the source ID. In step 414, the receiver may send an acknowledgement to the transmitter indicating successful receipt of the transmission.

If the two CRCs are not the same in step 410, the receiver determines that the transmitted CRC may be scrambled. In step 416, the receiver determines if all the source IDs in the list of active source IDs have been checked (i.e., used to try and decode the transmitted CRC). If so, then the receiver determines there was a transmission error and returns to step 400 to wait for a new packet. If not, the receiver tries to descramble/decode the transmitted CRC with a source ID in the active source ID list. In step 420, the receiver determines if the transmitted CRC was decoded successfully (e.g., by comparing the decoded CRC with the received CRC). If the CRC was decoded successfully, the receiver determines it has identified the source of the transmission, and in step 422 sends an acknowledgement to the transmitter. The receiver may also reset the expiration timer of the transmitter's source ID. Alternatively, if the contents of the transmission reveal that the transmission is the last in a session, the receiver may remove the source ID from the list of active source IDs. If the CRC was not decoded successfully, the receiver attempts other source IDs in the list of active source IDs until the list is exhausted or it finds a positive match. In alternative embodiments, the receiver may only notify the receiver when decoding was not successful instead of sending a positive acknowledgement.

Figure 5:
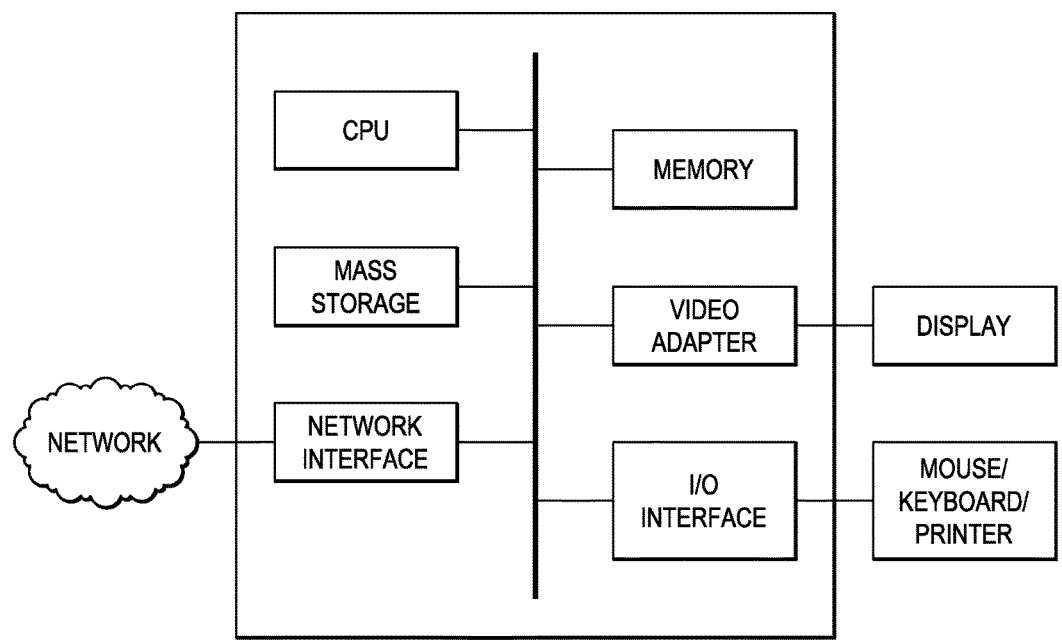
FIG. 5 is a block diagram illustrating a computing platform that may be used for implementing, for example, the devices and methods described herein, in accordance with an embodiment.

FIG. 5 is a block diagram of a processing system that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for transmission source detection comprising:

receiving, by a base station, a first transmission comprising a first data and an explicit first source identification (ID) from a user equipment, the explicit first source ID uniquely identifying the user equipment;

adding, by the base station, the explicit first source ID to a list of active source IDs, a first timer associated with the explicit first source ID being set upon adding the explicit first source ID to the list of active source IDs;

receiving, by the base station, a second transmission comprising a first portion containing a second data and a second portion after receiving the first transmission, at least the second portion of the second transmission being scrambled, wherein the second transmission excludes the explicit first source ID before the first timer expires;

determining, by the base station, the explicit first source ID from the second transmission by descrambling the second portion of the second transmission using the list of active source IDs after the explicit first source ID is added to the list of active source IDs; and removing, by the base station, the explicit first source ID from the list of active source IDs in response to detecting that the first timer expires.

2. The method of claim 1, further comprising sending an indication of a length of the first timer to the user equipment.

3. The method of claim 1, wherein the second portion of the second transmission is a data cyclic redundancy check (CRC) field comprising a CRC scrambled with the explicit first source ID.

4. The method of claim 3, wherein descrambling the second portion of the second transmission comprises attempting to descramble the second portion with each source ID in the list of active source IDs until the second portion is descrambled successfully.

5. The method of claim 1, further comprising resetting a second timer for the explicit first source ID each time a transmission from the user equipment is received by the base station.

6. The method of claim 1, further comprising removing the explicit first source ID from the list of active source IDs in response to the base station determining that the second transmission is a final transmission in a session with the user equipment.

7. A base station comprising:
a processor; and
a computer readable storage medium storing programming for execution by the processor, the programming including instructions to:
receive, by the base station from a user equipment, a first transmission comprising a first data and an explicit first source identification (ID) uniquely identifying the user equipment;
add, by the base station, the explicit first source ID to a list of active source IDs, wherein a first timer associated with the explicit first source ID is set upon adding the explicit first source ID to the list of active source IDs;
receive, by the base station, a second transmission comprising a first portion containing a second data and a second portion after receiving the first transmission, at least the second portion of the second transmission being scrambled, wherein the second transmission excludes the explicit first source ID before the first timer expires;
determine the explicit first source ID from the second transmission by descrambling the second portion of the second transmission using the list of active source IDs after the explicit first source ID is added to the list of active source IDs; and
remove, by the base station, the explicit first source ID from the list of active source IDs in response to detecting that the first timer expires.

8. The base station of claim 7, wherein the second portion of the second transmission is a data cyclic redundancy check (CRC) field, and wherein the data CRC field comprises a CRC scrambled with the explicit first source ID.

9. The base station of claim 8, wherein the second transmission includes a header field and a header CRC field.

10. A method for transmission source indication comprising:
transmitting, by a user equipment, a first transmission comprising a first data and an explicit source identification (ID) uniquely identifying the user equipment to a base station;
setting, by the user equipment, an expiration timer associated with the explicit source ID upon transmitting the first transmission;
transmitting, by the user equipment, a second transmission comprising a first portion containing a second data and a second portion to the base station after transmitting the first transmission, at least the second portion of the second transmission being scrambled with the explicit source ID, the second transmission excluding the explicit source ID before the expiration timer expires; and
transmitting, by the user equipment, a third transmission comprising the explicit source ID to the base station in response to detecting that the expiration timer expires.

11. The method of claim 10, further comprising receiving, by the user equipment, an indication of a length for the expiration timer from the base station.

12. The method of claim 10, wherein the method further comprises:
calculating cyclic redundancy check (CRC) bits for data transmission bits of the second transmission;
scrambling the CRC bits with the explicit source ID; and
adding the scrambled CRC bits to the second transmission.

13. A user equipment comprising:
a processor; and
a computer readable storage medium storing programming for execution by the processor, the programming including instructions to:
transmit, by the user equipment to a base station, a first transmission comprising a first data and an explicit source identification (ID) uniquely identifying the user equipment;
set, by the user equipment, an expiration timer associated with the explicit source ID upon transmitting the first transmission;
transmit, by the user equipment to the base station after transmitting the first transmission, a second transmission comprising a first portion containing a second data and a second portion, at least the second portion of the second transmission being scrambled with the explicit source ID, wherein the second transmission excludes the explicit source ID before the expiration timer expires; and
transmit, by the user equipment, a third transmission comprising the explicit source ID to the base station in response to detecting that the expiration timer expires.

14. The user equipment of claim 13, wherein the first transmission comprises a cyclic redundancy check (CRC) field comprising a CRC of the first transmission, and wherein the second transmission comprises a CRC field comprising a CRC of the second transmission, the CRC of the second transmission being scrambled with the explicit source ID.

15. The user equipment of claim 13, wherein the first and second transmission each comprise a header and a header cyclic redundancy check (CRC).

16. The user equipment of claim 13, wherein the programming includes further instructions to receive, by the user equipment, an indication of a length for the expiration timer from the base station.

17. The method of claim 1, wherein the first transmission further comprises an indication of a length of the first timer.

18. The method of claim 10, wherein the first transmission further comprises an indication of a length of the expiration timer.

19. The method of claim 10, further comprising setting an acknowledgement timer upon transmitting the first transmission.

20. The method of claim 1, further comprising:
receiving, by the base station, a third transmission comprising a third portion after receiving the first transmission, at least the third portion of the third transmission being scrambled; and
determining that the third transmission is transmitted from the user equipment upon successfully descrambling the third portion of the third transmission with the explicit first source ID in the list of active source IDs.

21. The method of claim 1, further comprising:
after the removing, receiving, by the base station, a third transmission comprising a third data and the explicit first source ID from the user equipment.

* * * * *